United States Patent [19]
Debrodt et al.

[11] Patent Number: 4,663,010
[45] Date of Patent: May 5, 1987

[54] ANODE FOR ELECTROCHEMICAL PROCESS

[75] Inventors: Heiner Debrodt, Nordendorf; Petra Kluger, Neusäss; Dieter Lieberoth, Wertingen, all of Fed. Rep. of Germany

[73] Assignee: Sigri GmbH, Meitingen, Fed. Rep. of Germany

[21] Appl. No.: 855,754

[22] Filed: Apr. 24, 1986

[30] Foreign Application Priority Data

May 8, 1985 [DE] Fed. Rep. of Germany ....... 3516523

[51] Int. Cl.⁴ .............................................. C25C 7/02
[52] U.S. Cl. ................................ 204/293; 204/105 R; 204/290 R
[58] Field of Search ................ 204/105 R, 290 R, 293

[56] References Cited

U.S. PATENT DOCUMENTS 3,033,775  5/1962  Chevigny et al. ................ 204/293
4,127,468 11/1978  Alfenaar et al. .................. 204/293
4,288,302  9/1981  de Nora et al. ................... 204/293

FOREIGN PATENT DOCUMENTS 45-41201 11/1970 Japan ................................ 204/293

Primary Examiner—Terryence Chapman
Attorney, Agent, or Firm—Herbert L. Lerner; Laurence A. Greenberg

[57] ABSTRACT

Anode, especially for the electrowinning of metals and metal compounds, formed of titanium alloy containing 0.5 to 5% nickel, 1 to 10% manganese and the remainder titanium.

11 Claims, 2 Drawing Figures

ANODE FOR ELECTROCHEMICAL PROCESS

BACKGROUND OF THE INVENTION

1. Field of the Invention

The invention relates to an anode of an alloy of titanium containing elements from Groups 8 and 7B of the Periodic System, especially for the electrowinning of metals or metal compounds.

2. Description of the Prior Art

Electrodes are used in the electrochemical production of chlorine, for the electrowinning of metals from hydrochloric or sulphuric acid electrolytes, in electrolysis of water and other electrochemical processes. These electrodes consist essentially of a passivatable metal whose surfaces are coated with electrochemically active substances for improvement of activity, for example with platinum metals or platinum metal oxides. The activating layers are gradually worn away in the use of the electrodes or their catalytic effect lessens with the result that the electrodes must be reactivated after certain periods of time, that is the electrodes must be provided with a new coating. The operating life of the activation layer is especially short if solid electrolysis products such as manganese dioxide in electrolysis for pyrolusite production are deposited on the electrodes since parts of the activation layer are torn off. This tearing off of activation layer occurs chiefly during the periodic removal of the product. In principle, this loss of activation materials can be reduced by a firmer anchoring or binding of the activating substances to the electrode base. A certain degree of protection is achieved by porous construction of the electrodes and depositing of the activating substances in the pores.

It is also known to alloy the activating substances with the titanium basic substance of the electrode. The electrode basic substance is for this purpose coated with a platinum metal, and intermetallic compounds of the general formulae MeTi or MeTi$_3$ which reach a few micrometers depth in the electrode are produced by heating of the coated electrode under reduced pressure, (German Offenlegungsschrift No. 26 45 414). Such diffusion layers are able to cope with stronger mechanical loads, although these electrodes are comparatively expensive on account of the high price of platinum metal. It is also known, to concentrate manganese on the surface of titanium anodes provided for the electrolytic production of manganese dioxide, the manganese being applied by diffusion, plasma spraying or sintering of powder mixtures of titanium-manganese (German Offenlegungsschrift No. 33 46 093). The manganese content on the surface of the titanium, preferably amounting to 20 to 60%, should drop within a layer thickness of 0.1 to 0.3 mm to 0%. In contrast to anodes which consist of titanium manganese alloy of the indicated composition over their entire thickness, these surface coated anodes are readily deformable and may be worked for example by rollers. Disadvantageously, the limited corrosion resistance of the anodes does not always suffice for the technical requirements to which the anodes are subjected. It is known to use alloys of titanium or another passivatable metal with chromium, manganese, rhenium, iron, cobalt, nickel, zinc, copper, silver, gold, cadmium, tin, lead, silicon, germanium, lanthanum or a platinum metal as the electrode (British Patent Specification No. 1 463 553 and equivalent U.S. Pat. No. 4,288,302). The electrodes are for example produced by shaping and sintering of the metal powder mixed in a given ratio of quantities and provided with a surface oxide layer which is formed as a result of a special oxidation treatment or in the intended use of the electrodes, for example in its use as an anode in an aqueous electrolyte. The electrodes are resistant to chemical attack and mechanical stressing and have a satisfactory electrochemical activity. The proportion of the alloy elements with these types of electrode amounts to 0.1 to 50%.

In another proposal, the electrode provided for the electrochemical recovery of metals consists of a titanium alloy which contains 51 to 55% nickel (U.S. Pat. No. 4,363,706). Above this region, the rate of corrosion of the anodes increases strongly, and below the region, the anode does not effectively cope with mechanical loading on account of its brittleness. The use of a high nickel content is however not always feasible in the electrodes, for example, the electrolysis product can be rendered impermissibly impure by nickel abrasion. The maximum permissible nickel content in electrolytically produced pyrolusites should not, for example, exceed a few ppm.

SUMMARY OF THE INVENTION

The invention is therefore based on the object of providing an anode of titanium alloy which contains an essentially low nickel content, is resistant to mechanical attack, is chemically resistant and has good electrochemical activity which hardly changes with time.

With the foregoing and other objects in view, there is provided in accordance with the invention an anode, especially for the electrowinning of metals and metal compounds, consisting of a titanium alloy containing 0.5 to 5% nickel and 1 to 10% manganese.

Other features which are considered as characteristic for the invention are set forth in the appended claims.

Although the invention is illustrated and described herein as embodied in an anode for electrochemical process, it is nevertheless not intended to be limited to the details shown, since various modifications may be made therein without departing from the spirit of the invention and within the scope and range of equivalents of the claims.

BRIEF DESCRIPTION OF THE DRAWINGS

The invention however, together with additional objects and advantages thereof will be best understood from the following description when read in connection with the accompanying drawings, in which.

DESCRIPTION OF THE PREFERRED EMBODIMENTS

Figure 1:
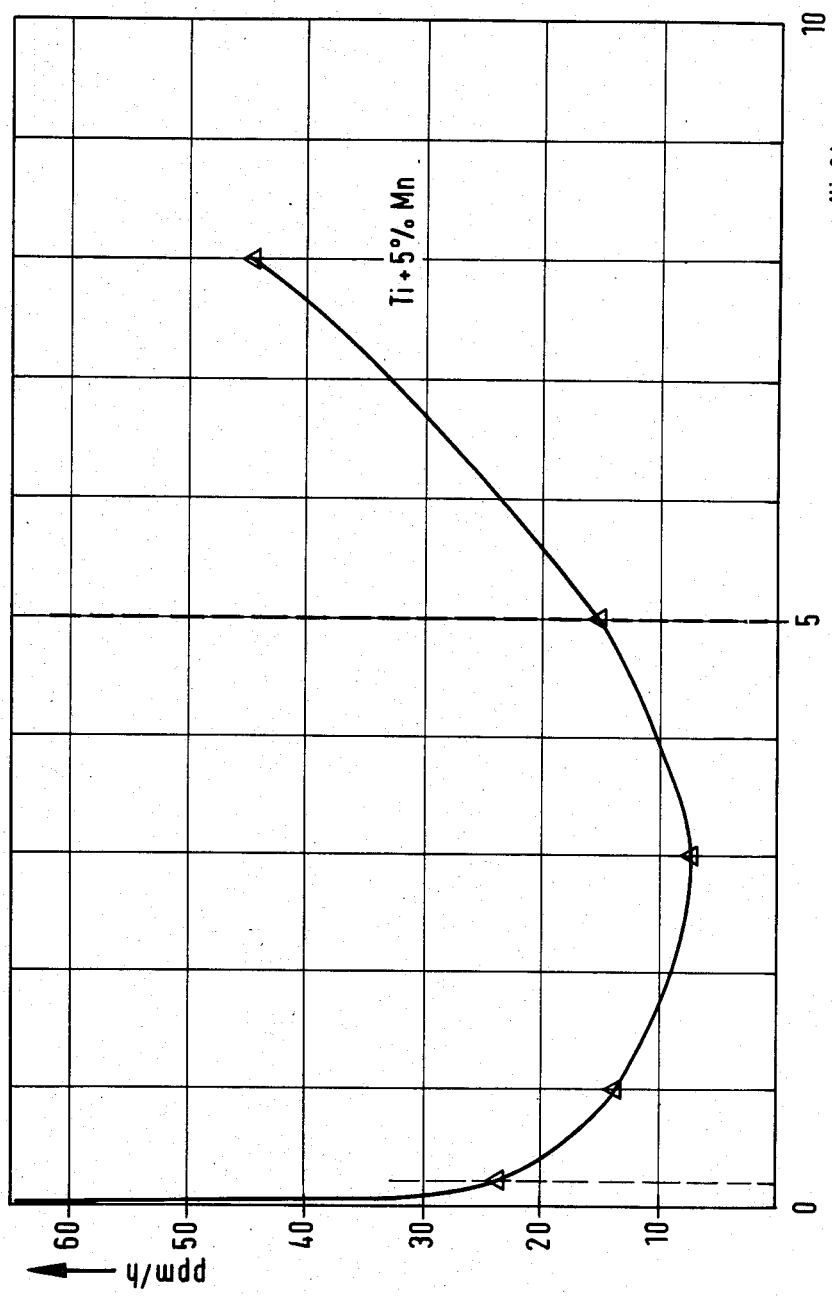
FIG. 1 shows the rate of corrosion of anodes in accordance with the nickel content.

The object of providing an anode of desired characteristics is solved with a titanium anode of the initially indicated type which is formed of an alloy containing 0.5 to 5% nickel, 1 to 10% manganese, and the remainder titanium. An alloy with the composition 1 to 4% nickel, 2 to 5% manganese and the remainder titanium, is preferred.

By the term "alloy" are meant all metallic compositions which have been produced by melting of the mixtures containing the three components or, preferably, by sintering of the powder mixtures of the components. The components of the alloys are generally present in the sinter bodies in more coarse aggregate forms than in the molten alloys and often neighbouring phases are not in thermodynamic equilibrium so that, in the sense of conventional terminology, it can be a question of mixtures. Since the transition from the pure solution to the pure mixture is continuous and the behaviour of the electrode is not essentially changed in the usual range of variation, all compositions are denoted as alloy independently of the actual form of aggregation. The ratio of the quantities of the components of the alloy is always indicated in mass or weight percent.

For the production of the anodes, one starts from alloyed titanium sheets, rods or other intermediate products, preferably from sintered bodies, for whose production, finely divided particles of titanium, nickel and manganese powder are mixed in a predetermined weight ratio and, optionally after addition of pressing auxiliaries or temporary binders, are compressed by pressing in a mold to bodies of predetermined form and measurement. The pressing pressure for this purpose is about 100 to 300 MPa. The shaped bodies are then sintered under reduced pressure or as appropriate under a protective gas by heating at about 1100° to 1300° C., with the sintering time amounting to about 2 hours. Higher protective gas pressures reduce in particular the losses by vaporization of the manganese alloying element. The bulk density of the sintered anodes, which depends in the particular case on the composition of the alloy, is about 3.5 to 4.0 g/cm$^3$, the specific electrical resistance being about 0.2 to 10 $\mu\Omega$m. A bulk density of the sintered anode which is greater than 3.8 g/cm$^3$ is preferred. Preferred also is a specific electrical resistance below 1 $\mu\Omega$m, since with anodes of this nature, a sufficient current density distribution is achieved even with a small anode thickness. Anodes of large surface area are produced appropriately from part layers of a first coating or layer of alloyed titanium, a second layer of titanium whose thickness is adjusted according to the required rigidity of the anode and optionally a second layer of alloyed titanium if two surfaces are to be used in the anode. For the production of the anode, the powder layers of different composition are coated over one another, with the thickness of each layer being proportional to the layer thickness in the finished anode. For matching of the mechanical properties and the electrical conductivity to the particular operating conditions, also advantageous are anodes which possess another sequence of layers, for example a first corrosion resistant and electrochemically active layer facing the electrolyte, a second layer with a small electrical resistance and a third mechanically strong and tough layer. The properties of the layers are adjusted in known manner through the composition of the powder mixture. The layered construction of the anode makes possible, without influencing the strength and electrical conductivity of the anode, the formation of layers with pores facing the electrolytes and, accordingly, the increasing of the electrochemically active surface. Such anodes may be more highly loaded electrically since the active surface is appreciably greater than the geometric surface of the anodes. Porosity and pore size distribution can be adjusted to the use conditions by choice of the particle size of the metal powder and the pressing and sintering conditions, especially appropriate being a porosity of 10 to 20% and an average pore size of a few micrometers.

Anodes are provided according to the invention in particular for the electrowinning of metals such as cobalt or metal compounds such as manganese dioxide from hydrochloric acid or sulphuric acid electrolytes. They are basically also suitable for other electrolyses, for example for alkali chloride electrolyses, for which the electrochemical activity of the alloyed anodes can, in known manner, be adjusted to the electrolysis conditions by addition of 0.01 to 0.1% of a metal of the platinum group or of compounds of one or more metals of the platinum group. The platinum metal or the compound is worked-up to an anode in the form of a fine powder together with the other components as described above or the porous surface zones of the anode are impregnated with a solution of a platinum metal or a platinum metal compound. A layer consisting of a platinum metal or a platinum metal oxide covering at least a part of the inner surface of the porous zones is produced by heating.

The invention is further explained in the following by examples with reference to the drawings. The percentage constituents forming the anode are by weight.

EXAMPLE 1

For the production of the anodes, titanium powder with a maximum particle size of 0.5 mm was mixed with different amounts of nickel and manganese powder having a maximum particle size of 0.01 mm. The powder mixture was compressed at room temperature to rectilinear plates 4×80×800 mm$^3$, with the density of the sintered bodies being adjusted by alteration of the molding pressure in the region between 180 and 200 MPa to about 3.80 to 3.90 g/cm$^3$ and the specific electrical resistance being adjusted to 0.5 to 1.0 $\mu\Omega$m. The shaped bodies were sintered by heating to 1200° C. under argon as a protective gas. Five samples of the same composition were subjected respectively to a corrosion test and for this purpose were placed in a glass flask with 10% sulphuric acid at a temperature of 95° C. ±3 K. Indicators of the progress of corrosion were the amount of hydrogen being evolved, the weight loss of the samples and the amount of dissolved corrosion products. The measured values combined for an average rate of corrosion are plotted in FIG. 1 against the nickel content of a titanium anode with 5% manganese. As will be noted from the curve in FIG. 1, small additions of nickel to a titanium-manganese alloy achieve a significant reduction in the rate of corrosion which is lowest with a nickel content of about 3%. The rate of corrosion of titanium-manganese alloys with no nickel or very low concentrations of nickel is so great under the experimental conditions that their use as anodes is practically impossible. For anodes with a sufficient operating life, the nickel content should be at least 0.5% and at the most 5%. The preferred nickel content is 1 to 4%.

Figure 2:
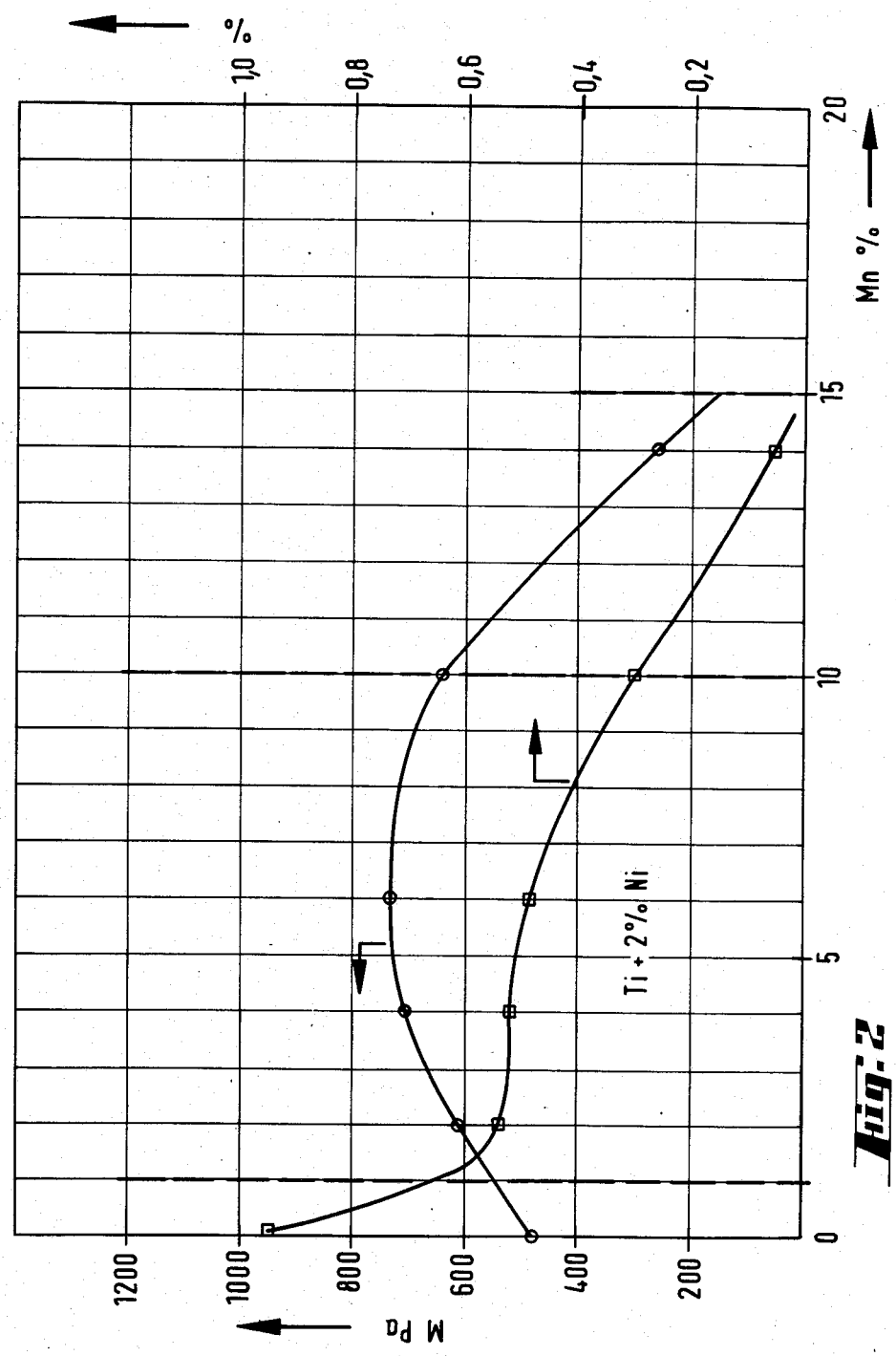
FIG. 2 shows elongation at break and bending strength of anodes in accordance with the manganese content.

In FIG. 2, the bending strength and the elongation at break under tension is plotted as a function of the manganese content for titanium anodes with 2% nickel. The bending strength increases with the addition of manganese up to a content of about 6% manganese and thereafter decreases continuously with increasing higher contents of manganese. The elongation at break, measured in terms as a measure of the brittleness in the tensile test, is at its greatest for manganese free alloy. Above a manganese content of 10%, the elongation at break becomes very small and the brittleness correspondingly large that the shaping of the anodes by rolling, bending and other non-tensioning processes is as a practical matter no longer possible. The manganese content of the anode alloy should therefore not be greater than 10%, preferably not more than 5%. Desirably, the manganese content of the anode alloy is 2 to 5% manganese.

EXAMPLE 2

As was described in Example 1, sintered anodes with the test numbers 1 to 5 were produced by mixing of titanium manganese and nickel powders, shaping of the mixture and sintering of the shaped bodies. The production of samples 6 to 12 and the composition of all the anodes is listed in Table I.

TABLE I

| Sample | Titanium (%) | Manganese (%) | Nickel (%) |
|---|---|---|---|
| 1 | 82 | 15 | 3 |
| 2 | 94 | 5 | 1 |
| 3 | 92 | 5 | 3 |
| 4 | 91 | 7 | 2 |
| 5 | 96 | 3 | 1 |
| 6 | 89 | 10 | 1 |
| 7 | 89 | 10 | 1 |
| 8 | 93 | 5 | 2 |
| 9 | 100 (sintered) | — | — |
| 10 | 100 (sheet) | — | — |
| 11 | 97 | — | 3 |
| 12 | 90 | 10 | — |

For the production of Sample 6, a shaped body of composition 5 was coated with an about 0.5 mm thick powder layer of composition 6 which was made into a paste with aqueous methyl cellulose and the coated shaped body was sintered. Sample 7 consists of a 4 mm thick titanium sheet as the basic layer of the anode and an alloy layer with a thickness of 0.3 mm applied by plasma spraying. Sample 8 is a sintered body with a bulk density of 4.43 g/cm$^3$, which was produced with a molding pressure of 400 MPa. For comparison, anodes of pure titanium (Sample 9-sintered body, Sample 10-sheet) and of a titanium-nickel (Sample 11) and a titanium-manganese alloy were produced and tested.

All the anodes were subjected to the corrosion test described in Example 1, the passivation was determined in 0.5 mm H$_2$SO$_4$ at 25° C. and 200 A/m$^2$ and the behaviour of the anodes in the electrolytic production of pyrolusite was determined. The electrolyte contained 35 g/l Mn, 60 g/l H$_2$SO$_4$, the electrolysis conditions were—temperature 95° to 98° C., current density 140 A/m$^2$, anode area 47.5 cm$^2$. Graphite plates were used as cathodes. The manganese dioxide layer accumulated on the anodes was removed after 12 days and the voltage of the cell on the following day was measured. The results are shown in Table II:

TABLE II

| | A Passivation Test | | B Corrosion Test | C Manganese dioxide deposition | | |
|---|---|---|---|---|---|---|
| Sample | t | U | | No. of cycles | Beginning U | End U |
| 1 | 867 h | 4.7 V | 10 ppm/h | 12 | 2.18 V | 3.02 V |
| 2 | 1841 h | 5.1 | 15 | 12 | 2.13 | 2.95 |
| 3 | 1493 h | 4.9 | 10 | 10 | 2.15 | 2.97 |
| 4 | 1610 h | 5.2 | 10 | 10 | 2.15 | 2.98 |
| 5 | 1943 h | 4.9 | 10 | 10 | 2.22 | 3.01 |
| 6 | 1610 h | 4.7 | 10 | 10 | 2.221 | 3.09 |
| 7 | 1610 h | 5.3 | 860 | 10 | 2.23 | 2.91 |
| 8 | 1432 h | 5.7 | 10 | 10 | 2.25 | 3.05 |
| 9 | 50 s | 6.5 | 45 000 | 12 | 2.43 | 4.25 |
| 10 | 10 s | 9 | 23 000 | 1 | 2.15 | + |
| 11 | 28 h | 4.2 | 10 | 10 | 2.26 | 3.68 |
| 12 | 1569 h | 3.5 | 44 000 | 10 | 2.19 | 3.02 |

+ passive after 6 days.

After a few seconds of operation, pure titanium forms on samples 9 and 10 a passivating layer which does not conduct the electric current and is not suitable for use as an anode. Also, anodes of manganese-free alloys (sample 11) form passivating layers comparatively quickly so that, in spite of lower rate of corrosion, they are not usable commercially. Anodes (sample 12) consisting of nickel-free titanium-manganese alloys corrode strongly like anodes of pure titanium. The anodes (samples 1 to 8) consisting of ternary alloys do not form any passivating layer, corrode very slowly and behave satisfactorily in the electrolytic production of manganese dioxide. On account of its brittleness, sample 1 (see FIG. 2) did not cope with mechanical loadings in an electrolysis operation, particularly with respect to the knocks taking place during the collection of the manganese dioxide on the anode. As a result of the increasing brittleness of the anode with manganese contents above 10%, in spite of the satisfactory electrochemical behaviour, their usability is limited since, even a combination with impact resistant support plates, cannot compensate for the brittleness. With impact-like loading, rather, relatively large parts of the anode are loosened from their supports as a result of which the operational life of the anode is essentially shortened.

The foregoing is a description corresponding, in substance, to German application No. P 35 16 523.5, dated May 8, 1985, international priority of which is being claimed for the instant application and which is hereby made part of this application. Any material discrepancies between the foregoing specification and the specification of the aforementioned corresponding German application are to be resolved in favor of the latter.

There is claimed:

1. An anode, especially for the electrowinning of metals and metal compounds, consisting of a titanium alloy containing 0.5 to 5% nickel and 1 to 10% manganese.

2. Anode according to claim 1, wherein the titanium alloy contains 1 to 4% nickel and 2 to 5% manganese.

3. Anode according to claim 2, wherein the anode is a sintered body.

4. Anode according to claim 2, wherein the bulk density is greater than 3.80 g/cm$^3$ and the specific electrical resistance is less than 1 $\mu\Omega$m.

5. Anode according to claim 1, wherein the anode is a sintered body.

6. Anode according to claim 5, wherein the bulk density is greater than 3.80 g/cm$^3$ and the specific electrical resistance is less than 1 $\mu\Omega$m.

7. Anode according to claim 1, wherein the bulk density is greater than 3.80 g/cm$^3$ and the specific electrical resistance is less than 1 $\mu\Omega$m.

8. Anode according to claim 1, wherein the sintered body consists of several layers of different composition.

9. Anode according to claim 8, wherein the layers near the surface are porous.

10. Anode according to claim 9, wherein a substance containing a metal selected from the group consisting of metals of the platinum group or compounds of metal of the platinum group is deposited in the porous layers.

11. Anode according to claim 10, wherein the metal content of said substance is 0.01 to 0.1%.

* * * * *